United States Patent [19]

Mayeur

[11] Patent Number: 4,641,015
[45] Date of Patent: Feb. 3, 1987

[54] PORTABLE COOKING APPLIANCE COMPRISING AN OVEN CHAMBER AND A COOKING HOTPLATE

[75] Inventor: Jacques Mayeur, Seynod, France

[73] Assignee: SEB S.A., Selongey, France

[21] Appl. No.: 691,641

[22] Filed: Jan. 15, 1985

[30] Foreign Application Priority Data

Feb. 3, 1984 [FR] France ............................ 84 01661

[51] Int. Cl.[4] ............................................. F27D 11/00
[52] U.S. Cl. ........................................ 219/386; 219/397; 219/393; 219/413; 219/475
[58] Field of Search ............... 219/385, 386, 393, 397, 219/413, 454, 472, 474, 475, 395, 396; 99/339, 340, 419

[56] References Cited

U.S. PATENT DOCUMENTS

| 1,542,330 | 6/1925 | Ball | 219/472 |
|---|---|---|---|
| 2,258,144 | 10/1941 | Parr | 219/454 |
| 2,266,099 | 12/1941 | Uhlrig | 219/454 |
| 2,738,723 | 3/1956 | Jennett | 99/329 |
| 2,798,930 | 7/1957 | Frost | 219/454 |
| 2,831,954 | 4/1958 | Pirz | 219/394 |

FOREIGN PATENT DOCUMENTS

| 2211281 | 9/1973 | Fed. Rep. of Germany . |
|---|---|---|
| 2324712 | 12/1974 | Fed. Rep. of Germany . |
| 3007266 | 9/1981 | Fed. Rep. of Germany . |
| 1433589 | 2/1966 | France . |
| 2302067 | 9/1976 | France . |
| 2334059 | 7/1977 | France . |
| 485603 | 5/1938 | United Kingdom . |

Primary Examiner—E. A. Goldberg
Assistant Examiner—Teresa J. Walberg
Attorney, Agent, or Firm—Young & Thompson

[57] ABSTRACT

A portable cooking appliance for the main purpose of cooking food in an oven or grilling food on a hotplate (4) includes a chamber (1) having an oven in which extends an electric resistance-heating element (14). There is placed at the top of the oven chamber (1) a cooking hotplate (4) beneath which extends an electric resistance-heating element (5). The element (5) is located within a compartment (6) which is separated from the oven chamber by a metal plate (7). The resistance-heating element (5) is connected to an adjustable thermostat (9) associated with a temperature probe (13). The electric resistance-heating element (14) is connected directly to the line supply by a switch (16) for interrupting the supply of current to the element (14) independently of the current supply to the resistance-heating element (5).

6 Claims, 4 Drawing Figures

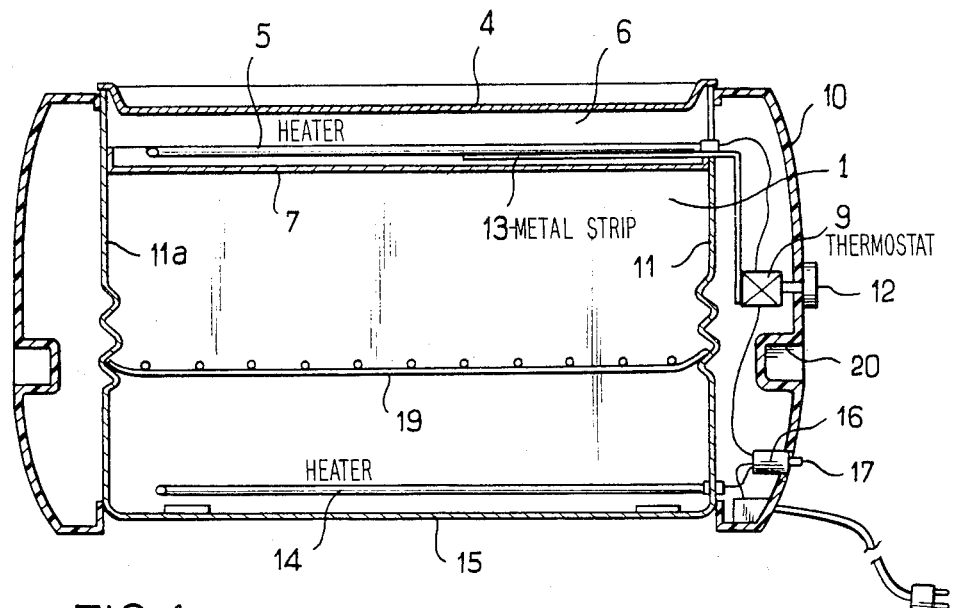
FIG_1
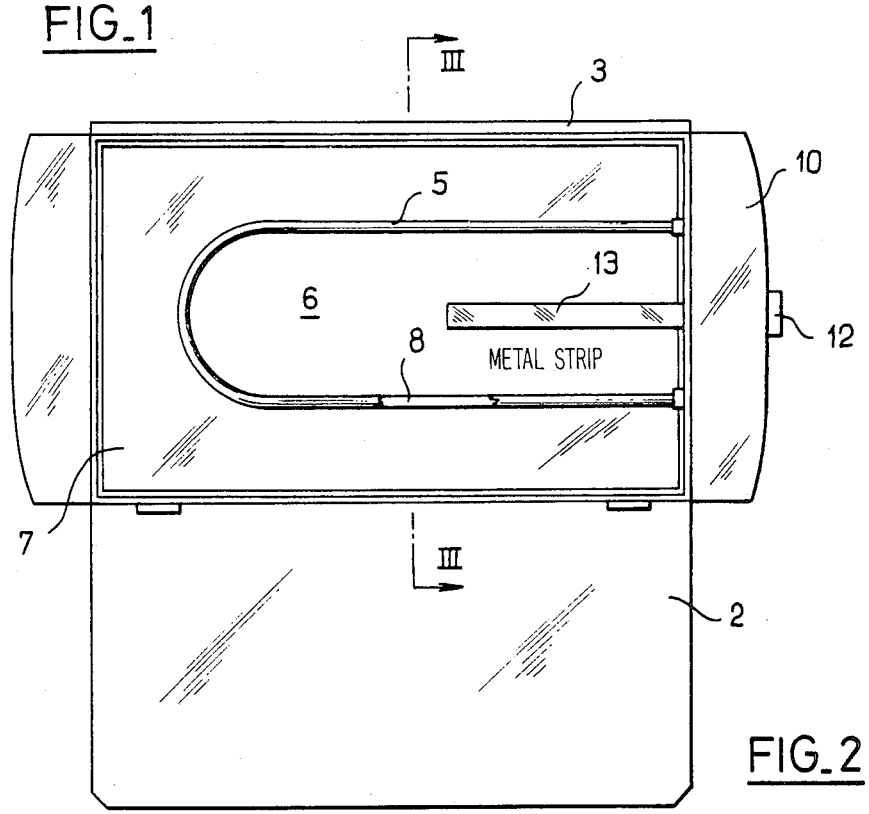
FIG_2

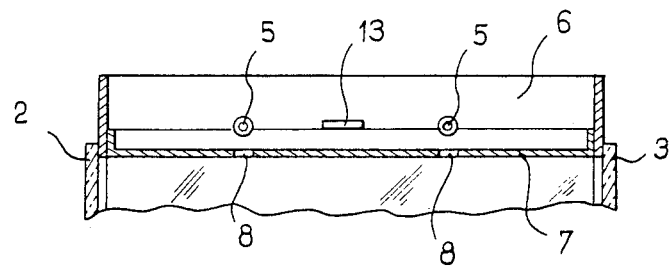
FIG_3
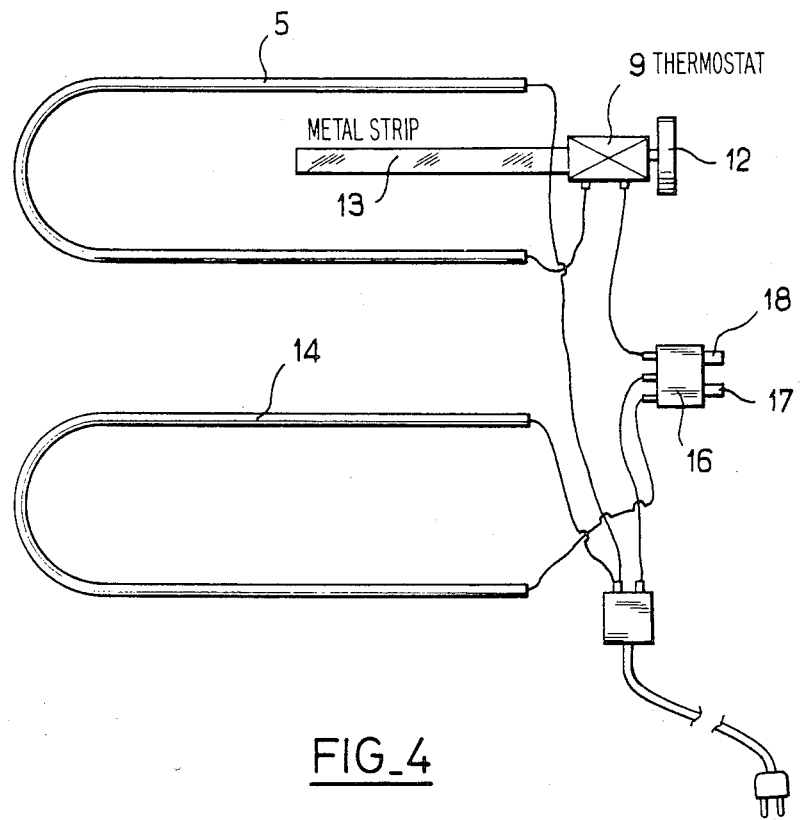
FIG_4

PORTABLE COOKING APPLIANCE COMPRISING AN OVEN CHAMBER AND A COOKING HOTPLATE

BACKGROUND OF THE INVENTION

1. Field of the Invention

The present invention relates to a portable cooking appliance which can in particular be placed on a table and comprises a chamber constituting an oven and a cooking hotplate placed above said chamber.

An appliance of this type permits cooking or heating of food products either in the oven or on the top hotplate or simultaneously within the oven and on the hotplate.

This class of appliance has relatively small dimensions in order that it may be easily carried by one person and placed on a dining-room table where the guests themselves can supervise cooking of food.

2. Description of the Prior Art

In this general class, two different types of cooking appliance are already known.

In a first type, a single resistance-type heating element is provided for heating the interior of the oven chamber and the cooking hotplate. The major disadvantage of this type of appliance lies in the fact that heating of the oven cannot take place independently with respect to heating of the hotplate, and conversely. Furthermore, in this type of appliance, the position of the resistance heating element is necessarily ill-suited for optimum simultaneous heating of the oven chamber and of the hotplate.

In the second known type of appliance, two resistance heating elements are provided one element is located at the top of the appliance beneath the hotplate and the other element is located within the oven chamber. The heating power of these elements can be regulated separately by means of a thermostat, thus making it possible to obtain satisfactory heating of the hotplate and of the interior of the oven. However, the constructional design of an appliance of this type entails high capital expenditure and is consequently incompatible with that of a cooking appliance which must have relatively small dimensions in order to be portable.

Moreover, it is found that the bimetallic thermostats which are employed in low-price appliances give rise to a relatively high temperature-regulation differential, with the result that it is not possible to obtain within the interior of the oven a sufficiently constant temperature to ensure good conditions for cooking food products.

This disadvantage is all the more marked in the case of appliances having small-size oven chambers made of thin, low-cost materials since their low thermal inertia does not make it possible to compensate for the effects of a high temperature -regulation differential.

SUMMARY OF THE INVENTION

The object of the present invention is to produce a portable cooking appliance having an oven chamber and a top cooking hotplate which is economical to construct, convenient to use and which also permits the achievement of optimum heating conditions within the oven chamber and for the hotplate in accordance with the requirements of users.

The portable cooking appliance contemplated by the invention comprises a chamber constituting an oven in which at least one of the lateral faces is closed by a door, an electric resistance-heating element being adapted to extend within said chamber. The appliance further comprises a cooking hotplate located at the top of the appliance above the oven chamber and an electric resistance-heating element extending beneath said hotplate, and means for regulating the heating temperature of said hotplate and within the oven chamber.

The distinctive feature of the appliance in accordance with the invention lies in the fact that the resistance-heating element which extends beneath the cooking hotplate is located within a compartment which is separated from the oven chamber by means of a metal plate and said plate provides a communication with the chamber by means of at least one opening, that said resistance-heating element is connected to an adjustable thermostat associated with a temperature probe which extends within said compartment, that the resistance-heating element placed within the oven chamber is connected directly to the power system by means of a switch for interrupting the current supply to said element independently of the current supply to the resistance-heating element which extends within the compartment located beneath the hotplate.

The cooking appliance in accordance with the invention therefore comprises two separate resistance-heating elements, one element being placed within the oven chamber and the other element being placed beneath the cooking hotplate, thus making it possible to satisfy optimum conditions of heating of said chamber and of said hotplate.

When the user desires to cook food in the oven, the two resistance elements are supplied with current. The element placed within the oven chamber is connected directly to the line supply and is therefore not adjustable whilst the element located beneath the cooking hotplate is adjustable by means of the thermostat.

By means of the resistance-heating element placed within the oven chamber, a constant heating power is diffused within said chamber. By means of the resistance-heating element placed beneath the cooking hotplate, heating power is diffused within the oven chamber through the metal plate located beneath said resistance element and can be adjusted by means of the thermostat.

Taking into account the heat losses to the exterior of the appliance, the heating temperature obtained within the oven chamber at the end of a predetermined period of time is substantially constant and is adjustable by means of the thermostat.

It is found that the temperature-regulation differential of the chamber is distinctly smaller than the differential obtained when heating is carried out with a single resistance element adjusted by means of a conventional thermostat.

The partition plate located beneath the resistance element of the upper compartment prevents food placed within the chamber from being subjected directly to radiations which would otherwise be liable to grill food instead of cooking it.

The opening or openings formed in the partition plate serve to regulate the distribution of heating power emitted by the resistance element towards the hotplate and towards the oven chamber.

When it is desired to cook food on the hotplate, it is only necessary for the user to interrupt the current supply to the lower resistance element and to regulate the heating power of the upper resistance element by means of the thermostat.

Thus the user can operate the appliance both in the oven position and in the hotplate-grilling position by operating a single thermostat. Optimum conditions of cooking temperature regulation are obtained in both cases.

In addition to the switch for interrupting the current supply to the lower resistance element when the user desires to grill food on the hotplate, the appliance advantageously comprises a switch for initiating simultaneous supply of current to both resistance elements in order to operate the appliance as an oven.

BRIEF DESCRIPTION OF THE DRAWINGS

Other features of the invention will be more apparent upon consideration of the following description and accompanying drawings, wherein:

FIG. 1 is a longitudinal sectional view of a cooking appliance in accordance with the invention;

FIG. 2 is a top view of the appliance after removal of the top cooking hotplate, one of the side doors being open;

FIG. 3 is a view of the top portion of the appliance after removal of the cooking hotplate, this view being taken in cross-section in a plane at right angles to FIG. 1;

FIG. 4 is a view showing the electric wiring arrangement for current supply and adjustment of the two electric resistance-heating elements of the appliance.

DETAILED DESCRIPTION OF THE INVENTION

In the embodiment of FIGS. 1 and 2, the portable cooking appliance in accordance with the invention comprises a parallelepipedal chamber 1 constituting an oven, the two large lateral faces of which are each closed by a glass door 2, 3 which is hinged at the bottom portion of the appliance.

The appliance is provided at the top portion above the chamber 1 with a detachable cooking hotplate 4 beneath which extends an electric resistance-heating element 5.

Said electric-heating resistance 5 extends beneath the cooking hotplate 4 within a compartment 6 which is separated from the chamber 1 by a metal partition plate 7 which communicates with the chamber 1 via one or a number of openings 8 (as shown in FIGS. 2 and 3). In the example illustrated, said opening is a slot 8 which extends beneath the resistance-heating element 5, the width of said slot 8 being such as to correspond substantially to the diameter of said resistance element 5.

The electric resistance element 5 is connected to a conventional bimetallic thermostat 9 housed within a casing 10 of insulating material which covers the side wall 11 of the chamber 1. Said thermostat 9 comprises a regulating knob 12 which is accessible to the user. The thermostat 9 is connected to a temperature probe 13 which extends within the compartment 6.

In the example illustrated, said temperature probe 13 is constituted by a strip of metal having good thermal conductivity such as aluminum which extends substantially at the center of the compartment 6 between the hotplate 4 and the partition plate 7 and over a distance equal at least to one-third of the length of the compartment 6.

A second electric resistance element 14 extends near the end-wall 15 of the chamber 1. This resistance element 14 is connected directly to the line supply (that is, without passing through a thermostat) by means of a switch 16 for interrupting the supply of current to said resistance element 14 independently of the current supply to the resistance element 5 which extends within the compartment 6 located beneath the hotplate 4.

To this end, said switch 16 comprises a pushbutton 17 (as shown in FIG. 4) as well as a push-button 18 for simultaneously initiating the supply of current to both resistance elements 5 and 14.

The electric resistance elexent 14 which extends near the end-wall 15 of the chamber 1 has a lower power rating than the resistance element which is placed within the upper compartment 6. By way of example, the resistance element 14 can have a power rating of 350 W and the resistance element 5 can have a power rating of 700 W.

The cooking hotplate 4 preferably has a surface which is treated for the purpose of absorbing thermal radiation emitted by the resistance elements 5 and 14. This treatment can consist of an acid attack which gives the plate 7 a rough nonreflecting surface.

For economic reasons, the lateral faces 11 and 11a of the chamber 1 are constructed of sheet steel but are not provided with any external heat insulation in order to promote heat losses to the exterior.

The operation of the cooking appliance in accordance with the invention will now be described.

When the user desires to cook food products within the chamber 1 or, in other words, when the appliance is intended to serve as an oven, the user actuates the pushbutton 18 of the switch 16 in order to effect simultaneous turn-on of heating of the resistance elements 5 and 14 and sets the thermostat 9 as a function of the desired temperature to be obtained within the chamber 1.

The lower resistance element 14 which is continuously supplied with current diffuses heat by direct radiation within the chamber 1, whilst the upper resistance element 5 which is regulated by means of the thermostat 9 diffuses heat partly towards the hotplate 4 and partly towards the chamber 1 via the partition plate 7.

The heating power of the lower resistance element 14 is constant, with the result that it heats the oven chamber up to a design temperature of equilibrium of the appliance, taking into account heat losses to the exterior, especially through the non heat-insulated walls 11 and 11a and through the glass doors 2 and 3.

Since the quantity of heat delivered by the upper resistance element 5 is adjustable, the user can modify the temperature within the chamber 1 by means of the thermostat 9, for example within a temperature range of 150° C. to 300° C.

The thermostat 9 operates when the temperature of the probe 13 placed within the compartment 6 attains the reference temperature which can be relatively displaced in value with respect to the temperature prevailing within the oven chamber 1.

It is found that the temperature-regulation differential within the chamber 1 is below 40° C. This value is distinctly lower than the value found when making use of a conventional bimetallic thermostat and of a probe placed within the chamber containing the resistance-heating element which is regulated by means of said thermostat.

When the user desires to grill food products on the hotplate 4, she or he need only interrupt the current supply to the lower resistance element 14 by actuating the knob 17 of the switch and by setting the thermostat 9 at the desired temperature which is usually lower than the temperature employed in the oven position.

The appliance in accordance with the invention therefore makes it possible by means of a single thermostat and two separate resistance elements to carry out cooking within the oven and on the hotplate at the same time and under optimum conditions of heating temperature regulation. The constructional design of the cooking appliance is consequently simple and inexpensive.

It will be clearly understood that the invention is not limited to the example which has just been described and any number of modifications may accordingly be contemplated without thereby departing either from the scope or the spirit of the invention.

Thus the slot 8 formed in the partition plate 7 can be replaced by one or a number of openings of different shapes. These openings may or may not be placed beneath the resistance element 5.

The shape of the resistance elements 5 and 14 could also be different from the shape illustrated in the accompanying drawings.

As will readily be apparent, the interior of the chamber 1 can be equipped with conventional accessories such as a grid 19 and a tray for collecting cooking juice.

The side casings 10 of heat-insulating material which covers the side walls 11 and 11a can each be provided with a recess 20 in order to enable the user to grip the appliance.

The cooking appliance could of course be provided with only one door.

In a simplified version, the upper resistance element 5 could be connected directly to the line supply as soon as the appliance is connected, a single switch being provided for interrupting the supply of current to the lower resistance element 14 when it is desired to employ the appliance as a grill. When said switch is placed in the "on" position, the two resistors 5 and 14 are both supplied with current and the appliance operates as an oven.

Moreover, the fact that the appliance has two opposite doors not only makes the interior of the oven very readily accessible to users but contributes to the achievement of a very rapid thermal equilibrium in conjunction with the fact that the side walls are of non heat-insulated sheet steel having small thickness. In fact, if provision were made for only one door and if the side walls were of substantial thickness and/or heat-insulated, the temperature within the oven would continuously increase in view of the fact that the lower resistance element 14 is continuously supplied with current.

What is claimed is:

1. A portable cooking appliance comprising a chamber (1) constituting an oven having lateral faces, in which at least one of the lateral faces is closed by a door (3), said chamber having a bottom wall (15), a first electric resistance heating element (14) which extends within said chamber near said bottom wall (15), the appliance being further provided with a cooking hotplate (4) located at the top of the appliance above the oven chamber (1), and a second electric resistance-heating element (5) extending beneath and hotplate and located with in a compartment (6), a metal plate (7) between the chamber (1) and the compartment (6), said compartment (6) communicating with the chamber (1) by means of at least one opening (8) through said plate (7), wherein said second resistance-heating element (5) is connected to the electrical power supply by an adjustable thermostat (9) associated with a temperature probe (13) which extends within said compartment (6) and wherein said first resistance-heating element (14) within the oven chamber (1) is connected directly to the electrical power supply, the power of the first resistance-heating element (14) being lower than that of the second resistance-heating element (5) and being adapted to heat the chamber to a predetermined temperature, the two said resistance-heating elements being connected to switch means (16,18) to enable operation of the appliance in the three following conditions:

a condition in which only the first heating-resistance (14) heats the chamber (1), a condition in which only the second heating-resistance (5) heats the compartment (6), and a condition in which the two heating resistances (14,5) heat both the chamber (1) and compartment (6).

2. A cooking appliance according to claim 1, wherein the metal plate (7) has a slot (8) which extends beneath the resistance-heating element (5) and the width of which corresponds substantially to the width of said resistance element.

3. A cooking appliance according to claim 2, wherein the hotplate (4) has a surface which is treated for absorbing heat radiated by the resistance element (5).

4. A cooking appliance according to claim 3, wherein the temperature probe (13) placed within the upper compartment (6) is a strip of metal having good thermal conductivity which extends substantially centrally of the compartment (6) between the hotplate (4) and the metal plate (7).

5. A cooking appliance according to claim 4, wherein the oven chamber (1) has two opposite lateral faces each closed by a glass door (2, 3).

6. A cooking appliance according to claim 5, wherein the oven chamber (1) has two other opposite lateral faces (11, 11a), of sheet metal that are not heat-insulated.

* * * * *